(12) United States Patent
Peacocke et al.

(10) Patent No.: US 6,818,042 B2
(45) Date of Patent: Nov. 16, 2004

(54) METHOD OF MINERAL CONCENTRATE REDRESS

(75) Inventors: Kevin Gordon Peacocke, Harare (ZW); Lloyd Arthur Skinner, Harare (ZW)

(73) Assignee: Knelson Patents Inc., Langley (CA)

( * ) Notice: Subject to any disclaimer, the term of this patent is extended or adjusted under 35 U.S.C. 154(b) by 206 days.

(21) Appl. No.: 10/126,934

(22) Filed: Apr. 22, 2002

(65) Prior Publication Data

US 2002/0162420 A1 Nov. 7, 2002

Related U.S. Application Data

(60) Provisional application No. 60/284,880, filed on Apr. 20, 2001.

(51) Int. Cl.[7] .................................................. C22B 1/00
(52) U.S. Cl. .................................... 75/710; 209/44
(58) Field of Search ............................. 75/710; 209/44

(56) References Cited

U.S. PATENT DOCUMENTS 4,209,386 A * 6/1980 Giffard ....................... 209/459
4,685,963 A * 8/1987 Saville ....................... 75/10.19

* cited by examiner

Primary Examiner—Melvyn Andrews
(74) Attorney, Agent, or Firm—Adrian D. Battison; Michael R. Williams; Ryan W. Dupuis

(57) ABSTRACT

A slurry of particulate ore material is concentrated to form a smeltable concentrate on a re-concentrator table arranged to separate concentrate ore at a concentrate discharge from middlings and tailings. The table is set such that the concentrate forms a smeltable concentrate and thus at least the middlings contain significant quantities of the concentrate to be collected. The ore to be concentrated is fed to a feeding system including a bin in batch form and carried from the bin by a screw through a screen to the table. The table is operated in processing of the batch for a first period of time during which both the middlings and tailings are returned to the feeding system for recirculation to the table. The period of time is such that the material is circulated over the table repeatedly to separate out the concentrate. After the first period, for a second period, the table is operated while directing at least the tailings and possibly the middlings to discard so as to reduce the batch sufficiently to receive the next batch.

8 Claims, 4 Drawing Sheets

METHOD OF MINERAL CONCENTRATE REDRESS

This application claims priority under 35 U.S.C.119 from Provisional Application Ser. No. 60/284,880 filed Apr. 20, 2001.

This invention relates to a method of mineral concentrate redress for upgrading a concentrate to smeltable ore.

BACKGROUND

Concentrates generated in any process, which is typically but not essentially a gravity process, frequently require to be upgraded preferably to a smeltable grade ore. Where the desired component in the primary concentrate has a higher specific gravity than the accompanying gangue, then the application of a redress technique utilizing gravity may be used to separate the desired component from the gangue and thus concentrate the desired constituent.

Several methods and devices exist to enable the separation to be effected, but these are not automated and do not deal with the associated functions involved.

Many designs and arrangements of re-concentrator table are available and have been widely used, for example the Gemini table, which is adjusted to vary the ratio of concentrate to middlings and tailings by varying the water supply to the table and by varying a bumper stop adjustment which controls the amount of vibration.

SUMMARY OF THE INVENTION

It is one object of the present invention to provide a method for controlling the supply of material to a re-concentrator table to improve efficiency of operation.

According to a first aspect of the invention there is provided a method of concentrating a slurry of particulate ore material for separation of a smeltable concentrate comprising:
  providing a re-concentrator table arranged to separate concentrate ore at a concentrate discharge from middlings and tailings;
  setting the re-concentrator table such that the concentrate forms a smeltable concentrate and thus at least the middlings contain significant quantities of the concentrate to be collected;
  feeding the ore material to the table from a feeder;
  operating the table for a first period of time during which both the middlings and tailings are returned to the feeder for recirculation to the table;
  after the first period, for a second period, continuing to operate the table while directing at least the tailings to discard;
  and collecting the concentrate ore.

Preferably during the second period the middlings continue to return to the feeder.

Preferably the operation of the table is halted after the second period for a dwell period.

Preferably the operation of the table is halted at a time when material remains in the feeder ready for receiving a further batch.

Preferably the first period of time constitutes the majority of the operating time so that the feed materials are re-circulated over the table a number of times during the first period.

Preferably the second period is sufficient to reduce the quantity of material in the feed from an original batch down to a required reduced amount for maintaining in the feeder ready to receive a subsequent batch.

Preferably the feeder is arranged to receive a batch from a batch machine supplying the feeder.

Preferably the table includes a water supply and wherein the feeder includes a water overflow such that the water returned to the feeder with the middlings and tailings is discharged from the feeder.

Preferably the feeder comprises a hopper for receiving a batch of material and a feed screw for carrying the particulate ore from the hopper upwardly from the hopper leaving water in the hopper for discharge onto the table.

Preferably there is provided a screening system optionally including a magnetic separator between the feeder and the table.

Preferably there is provided a diverter valve controlled by a timer for diverting the tailings from the return during the first period to the discard during the second period.

Preferably the table, the hopper, the feed screw, the diverter valve and the tailings pump are mounted on a frame as a common construction.

BRIEF DESCRIPTION OF THE DRAWINGS

One embodiment of the invention will now be described in detail in conjunction with the accompanying drawings in which.

DETAILED DESCRIPTION

Figure 1:
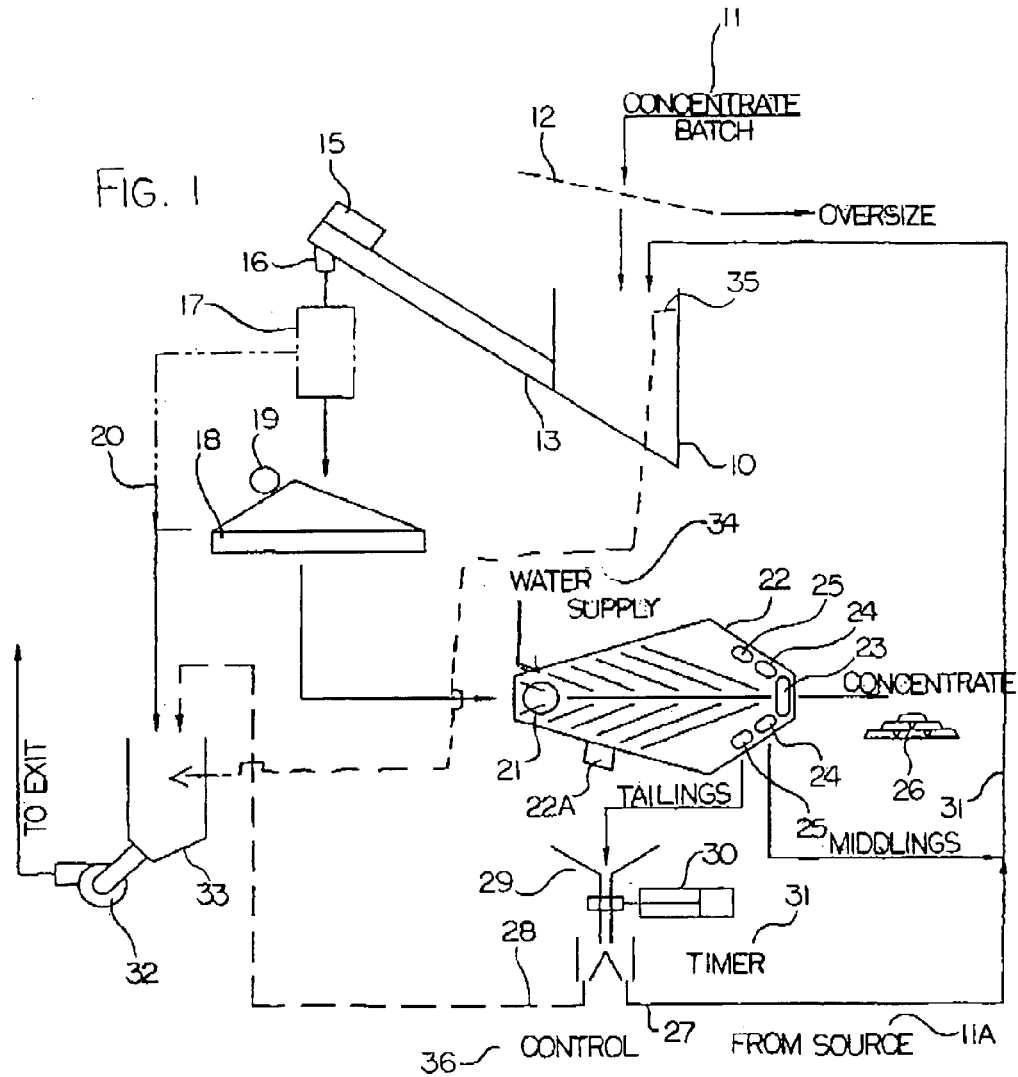
FIG. 1 is a schematic illustration of the method according to the present invention.

The apparatus for carrying out the method is shown in the figures and comprises a feeding system including a feed bin 10 into which a batch of the concentrate to be re-dressed is provided from a source 11 through a screen 12. Thus oversize material is discarded from the screen and the remaining batch deposited into the bin 10. The bin 10 includes an inclined bottom wall 13 along which runs a feeder screw 14 driven by a motor 15. The screw 14 carries particulate material from the slurry within the bin 10 leaving water within the bin as the material is carried from the bottom of the bin. The material at the top of the screw 15 is discharged through a discharge 16 into an optional magnetic separator 17 which is of a conventional construction and acts to extract ferro-magnetic particles for discharge. The material from the magnetic separator is discharged onto a vibrating screen 18 which is operated by a motor 19 acting to discard oversized particles into a discharge stream 20 and to pass the material for concentration into a table feed hopper 21. The table feed hopper 21 discharges onto a re-concentrator table 22 of a conventional construction. The re-concentrator provides a concentrate discharge location 23, two middlings discharge locations 24 and two tailings discharge locations 25. The concentrate from the concentrate discharge location 23 is collected in a suitable collection container 26 for smelting.

Figure 3:
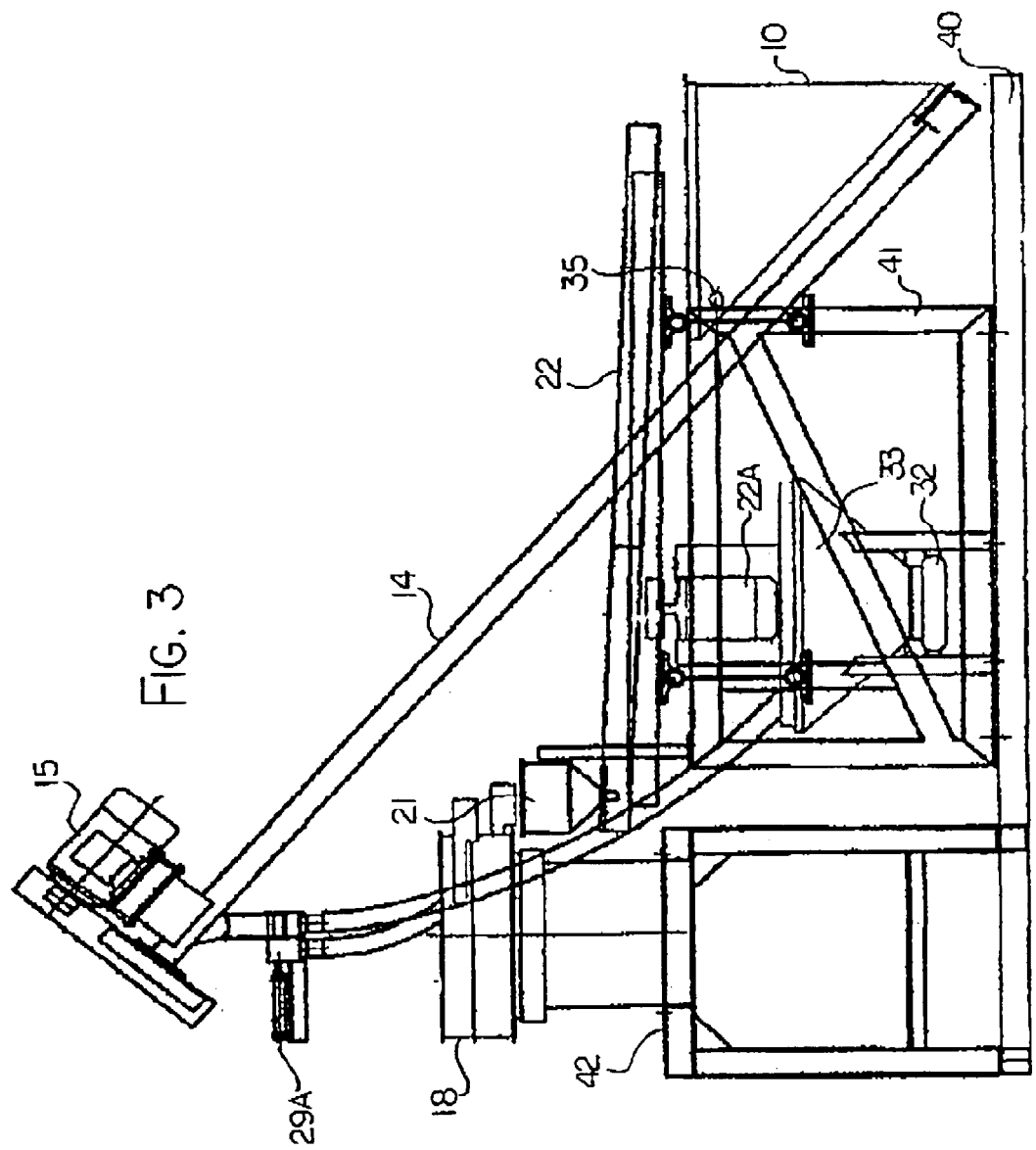
FIG. 3 is a side elevational view of the apparatus of FIG. 2.
Figure 4:
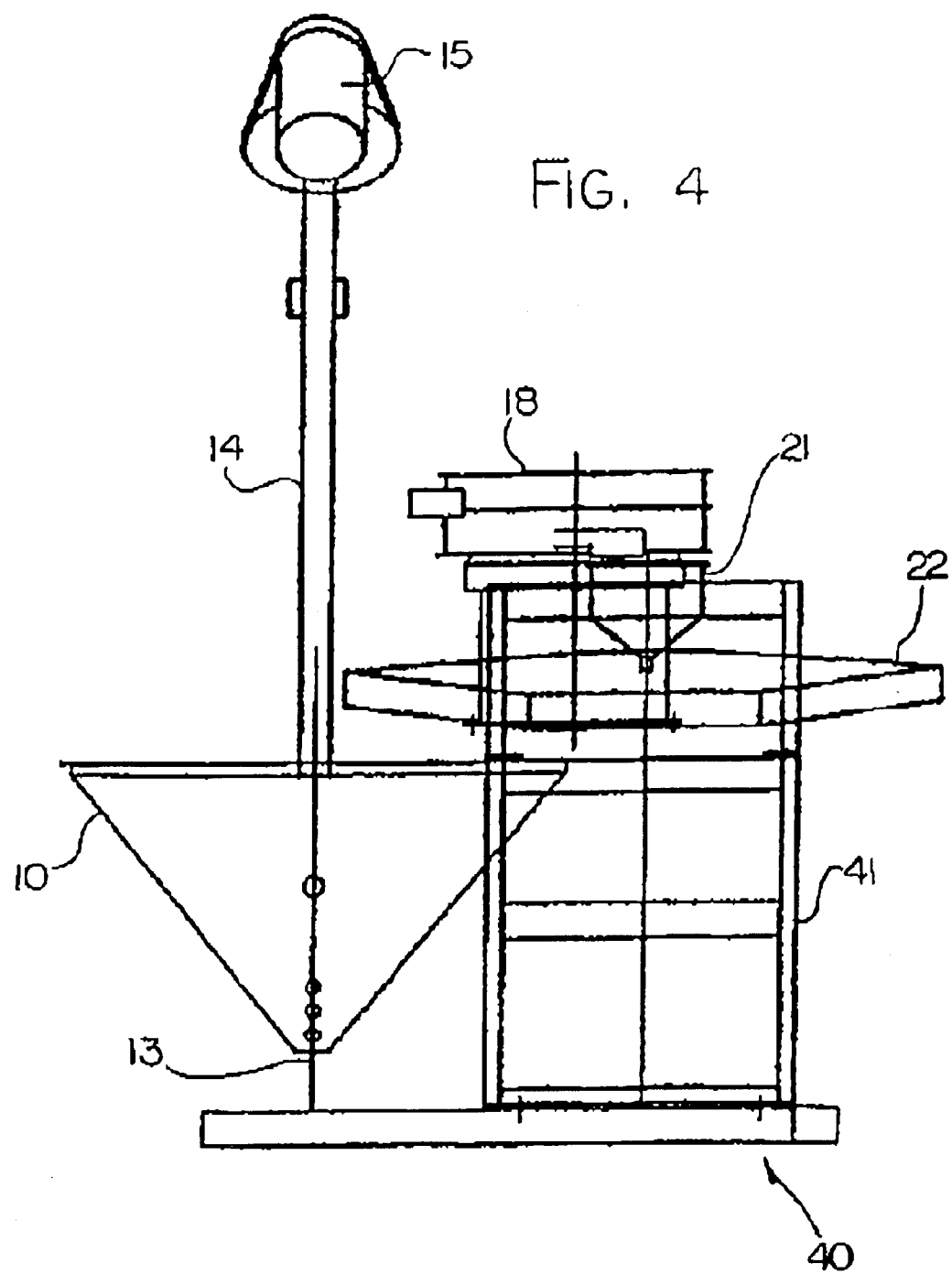
FIG. 4 is a front elevational view of the apparatus of FIG. 2.

The re-concentrator table 22 as shown in FIGS. 3 and 4 is located at a height above the bin 10 so that the middlings can be discharged under gravity directly back to the bin 10. The tailings from the tailing locations 25 are discharged into a diverter valve 29 as shown in FIG. 1 so that the tailings can be discharged into a first stream 27 or a second stream 28 depending upon the selected position of the diverter valve 29 as controlled by an actuator 30 and a timer 30A. The stream 27 of the tailings is added to the stream 31 of the middlings and returned to the bin 10. When the valve is moved to the position discharging the tailings into the stream 28, the tailings are fed to a tailings pump 32 having a feed hopper 33 which receives also the discharge stream 20 from the screen 18 and the magnetic separator 17.

An additional water supply 34 is provided for supplying water to the re-concentrator table 22 to improve the efficiency of separation at that table. A water overflow 35 is provided at the top of the bin 10 so that the water that is returned in the stream 31 to the bin with the middlings and tailings of the particulate materials can be overflowed to the tailings pump 32. A control unit 36 is provided for controlling the motors 15, 19 and a motor 22A at the table 22 and for controlling the tailings pump 32 and the timer 30A of the discharge valve 29. The control unit 36 receives information from the batch source as indicated at 11A.

Figure 2:
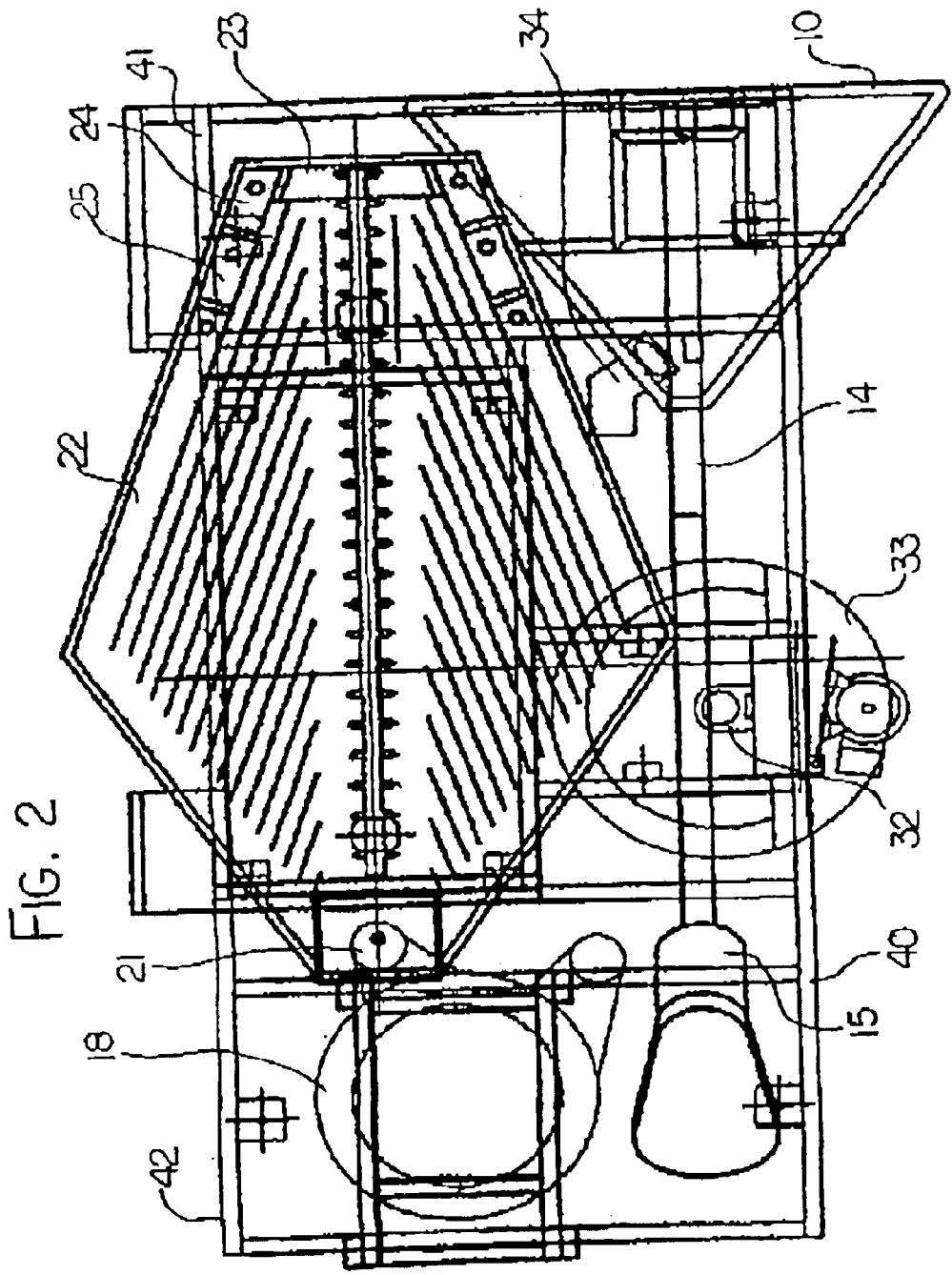
FIG. 2 is a top plan view of the apparatus for carrying out the method.

In FIGS. 2, 3 and 4 the components described above are shown in more detail mounted on a frame 40. For convenience of illustration the piping between the components is omitted. It will be noted that the table 22 is mounted up on a frame portion 41 at one side of the base frame and the other side of the base frame is mounted the feed bin 10 adjacent the bottom end of the table with the screw 14 extending upwardly along the frame alongside the table to the discharge carried on a frame portion 42 at the upper end for feeding downwardly onto the vibrating screen 18 also carried on the frame portion 42.

In FIG. 3 is shown an alternative arrangement to that shown schematically in FIG. 1 in which the diverter valve 29A is located at the discharge from the screw 14 so that it operates the discharge all of the materials during the second period from the screw to the tailings pump. This arrangement is practical and will operate effectively since at this time substantially all of the gold or other ore has been collected. However the preferred arrangement is shown in FIG. 1 where the middlings during the second period continue to return to the feed and the diverter valve 29 is arranged only on the tailings.

The primary concentrate consisting of the desired component and the gangue passes to the feed bin 10 via the screen 12. Simultaneously all of the electrical components and motors are energized and the total cycle timer and divert cycle timer are set to zero. The primary concentrate settles in the bin 10 and is thence transported via the feeder screw 14 to the optional magnetic separator if selected, and thence to the vibrating screen 18, or directly to the vibrating screen if the magnetic separator is absent. The vibrating screen removes the oversize and the undersize passes to the feed of the re-concentrator. The re-concentrator separates the desired components from the gangue and deposits the desired components into a receptacle. The tailings and the middling streams from the re-concentrator table 22 are recycled via the feeder and bin to the re-concentrator table 22, this recycle increases the efficiency of separation.

After a pre-set interval the divert timer 30A times out and the tailings from the re-concentrator are diverted to the tailings pump 32 and from thence exit the process. The middling product from the re-concentrator table 22 continues to recycle to the re-concentrator. After a second pre-set interval the total cycle timer times out and the entire system is de-energized. The total cycle timer in the control unit and the divert cycle timer re-set to zero so that the system enters a dwell period awaiting a signal from the primary concentrate source to commence the entire sequence as described once more. The entire sequence is automated and driven via the control unit in the form of a PLC. This repetitive task continues until the process is taken off line.

Being automated, the process is initiated and the cycle continues without interruption or supervision. The desired component and the oversize from the screen 12 is collected periodically or conveyed via whatever means to a desired destination.

The process is unique in that it performs the function of primary concentrate upgrade in an automatic and therefore secure environment. The process addresses all of the issues which have hitherto rendered attempts at this task unworkable. In particular, the process manages the water balance and removes excess water without detriment to the efficiency. The process also maximizes efficiency by utilizing the inherent tendency for the desired component, being more dense, to preferentially settle. The system makes provision for time-cycle flexibility and therefore renders it suitable to a wide range primary concentrate types.

The re-concentrator table can be of any common known type for example the Gemini table which is adjusted to vary the ratio of concentrate to middlings and tailings by varying the water supply to the table and by varying a bumper stop adjustment which controls the amount of vibration. Other types of table can be used and the adjustment in those other tables is of course different.

The intention is that the table is adjusted so that it provides a very high or maximum grade of concentrate so that the concentrate is a directly smeltable ore. It will be appreciated that adjusting the table as it operates in this manner necessarily causes an increase in the amount of the required concentrate which goes to the middlings and to the tailings. In is conventionally not acceptable, therefore, to adjust the table to this extent since that concentrate would otherwise be lost.

After adjustment of the table in this way, the next batch of material is fed into the feeder bin along with the existing water in the bin from the previous batch and along with the existing material in the feed screw which is maintained after the process is halted at the end of the second period and is maintained therein during the dwell period.

During operation, the batch material in the bin 10 is processed. The particulate material from the bin 10 is carried by the feed screw 14 upwardly and outwardly from the bin so that the water remains in the bin and the particulate material when the screw is filled is discharged over the top of the screw into the screening system and from there on to the table.

The process is operated during the first period of time as a recycle system in which both the tailings and the middlings are returned to the feed system and particulary feed bin 10 and the process is run for a period of time for example 45 minutes during which the process has sufficient time for the material to pass over the table a number of times for example 5 times. This recycling of the material gives opportunity for the concentrate to be discharged through the concentrate discharge system of the table for collection. In view of the above setting, some of the concentrate ore discharges to the middlings and tailings and this is recycled for return to the table and passage over the table a further period of time.

The period of time is selected relative to the batch time of the previous machine which in one example might be of the order of 1 hour so that the recycling period constitutes the majority of the time concerned that is approximately 45 minutes within approximately 1 hour. During this period of time therefore the majority of the concentrate is extracted at the concentrate discharge and collected.

The settings and control are arranged so that the time period is not sufficient that all of the concentrate is collected so that some remains in the recycle at the end of the first period. At this time the diverter valve 29 is operated to extract the tailings from the table and to return those tailings to the discharge pump for discard. This second period is continued to run so that the original batch is reduced down to a required level for receiving the next batch, that is by extracting at the tailings an amount equal to the amount of the next batch. In practice the amount of material maintained in the system at the end of the second period is sufficient to maintain the screw substantially filled so that, as soon as the next batch is supplied after the dwell time, the screw 14 remains filled and is ready to restart the feeding onto the table 23. The next batch is therefore mixed with the remaining part of the previous batch and the material is again recycled in a further process.

The system therefore operates primarily in a recycle mode so that all of the material is recycled for a period of time to allow the material to pass several times over the table and then the process is operated to discard the tailings so as to reduce the batch down to the required lower level for receiving the next batch. Depending upon the settings of the table and thus the proportions of the tailings relative to the middlings and concentrate, the time period for the second operation can vary but in one example would be of the order of ten minutes leaving a time period of the order of 5 minutes for a dwell time waiting for the next batch from a one hour batch machine.

What is claimed is:

1. A method of concentrating a batch of particulate ore material in a slurry for separation of a smeltable concentrate comprising:

providing a re-concentrator table arranged to separate concentrate ore at a concentrate discharge from middlings and tailings;

setting the re-concentrator table such that the concentrate forms a smeltable concentrate and thus at least the middlings contain significant quantities of the concentrate to be collected;

feeding the particular ore material to the table from feeding system;

operating the re-concentrator table for a first period of time during which both the middlings and tailings are returned to the feeding system for recirculation to the re-concentrator table;

after the first period, for a second period, continuing to operate the re-concentrator table while directing at least the tailings to discard;

and collecting the concentrate ore.

2. The method according to claim 1 wherein during the second period the middlings continue to return to the feeding system.

3. The method according to claim 1 wherein the operation of the table is halted after the second period for a dwell period.

4. The method according to claim 3 wherein the operation of the re-concentrator table is halted at a time when particulate ore material remains in the feeding system ready for receiving a further batch of particulate ore material.

5. The method according to claim 1 wherein the first period of time constitutes the majority of the operating time so that the particulate ore materials are recirculated over the re-concentrator table a number of times during the first period.

6. The method according to claim 1 wherein the second period is sufficient to reduce the quantity of material in the particulate ore materials from the batch down to a required reduced amount for maintaining in the feeding system ready to receive a subsequent batch.

7. The method according to claim 1 wherein the re-concentrator table includes a water supply and wherein the feeding system includes a water overflow such that water returned to the feeding system with the middlings and tailings is discharged from the feeding system.

8. The method according to claim 1 wherein the feeding system comprises a feed bin for receiving the batch of particulate ore material and a feed screw for carrying the particulate ore from the feed bin upwardly from the feed bin for discharge onto the table leaving water in the feed bin.

* * * * *